US012636735B2

(12) United States Patent
    Kariat

(10) Patent No.: US 12,636,735 B2
(45) Date of Patent: May 26, 2026

(54) WELD QUALITY INSPECTION SYSTEM

(71) Applicants: Sreevidhya Kariat, Troy, MI (US);
    MAGNA INTERNATIONAL INC.,
    Aurora (CA)

(72) Inventor: Sreevidhya Kariat, Troy, MI (US)

(73) Assignee: MAGNA INTERNATIONAL INC.,
    Aurora (CA)

( * ) Notice: Subject to any disclaimer, the term of this
    patent is extended or adjusted under 35
    U.S.C. 154(b) by 358 days.

(21) Appl. No.: 18/272,639

(22) PCT Filed: Feb. 1, 2022

(86) PCT No.: PCT/US2022/014691
    § 371 (c)(1),
    (2) Date: Jul. 17, 2023

(87) PCT Pub. No.: WO2022/169743
    PCT Pub. Date: Aug. 11, 2022

(65) Prior Publication Data
    US 2024/0082963 A1     Mar. 14, 2024

Related U.S. Application Data

(60) Provisional application No. 63/144,719, filed on Feb.
    2, 2021.

(51) Int. Cl.
    B23K 31/12        (2006.01)
    G05B 19/418       (2006.01)
(52) U.S. Cl.
    CPC ...... B23K 31/125 (2013.01); G05B 19/41875
        (2013.01); *G05B 2219/32368* (2013.01); *G05B*
                                *2219/45135* (2013.01)

(58) Field of Classification Search
    CPC .. B23K 31/125; B23K 9/0953; B23K 9/0956;
            B23K 9/173; B23K 31/006; B23K 9/167;
                        (Continued)

(56) References Cited

U.S. PATENT DOCUMENTS

| | | | |
|---|---|---|---|
| 2016/0193680 A1 | 7/2016 | Pesme et al. | |
| 2016/0375524 A1 | 12/2016 | Hsu | |

(Continued)

FOREIGN PATENT DOCUMENTS

| | | | |
|---|---|---|---|
| CN | 105855743 B | 6/2018 | |

OTHER PUBLICATIONS

Supplementary European Search Report for EP22750242.4 dated
Dec. 6, 2024.

*Primary Examiner* — Charles R Kasenge
(74) *Attorney, Agent, or Firm* — DICKINSON WRIGHT
PLLC

(57)                ABSTRACT

A weld quality inspection system for indicating a quality of
a weld during a welding process on at least one work piece.
The weld quality inspection system includes an infrared
camera configured to provide visual data of a weld pool. A
microphone is configured to provide audio data of an arc of
a welder. At least one operational technology (OT) data
source is configured to provide OT data. A controller is
configured to receive the visual data, the sound data and the
OT data to determine if conditions associated with a bad
weld are met and to provide feedback to an operator or robot
in response to a detection that the conditions are met.

9 Claims, 4 Drawing Sheets

(58) Field of Classification Search
CPC .... G05B 19/41875; G05B 2219/32368; G05B
2219/45135
See application file for complete search history.

(56)                       References Cited

U.S. PATENT DOCUMENTS

| 2017/0032281 A1 | 2/2017 | Hsu | |
| 2021/0318673 A1* | 10/2021 | Kitchen | B23K 31/006 |
| 2022/0066435 A1* | 3/2022 | Thimmanaik | G06T 7/0006 |

* cited by examiner

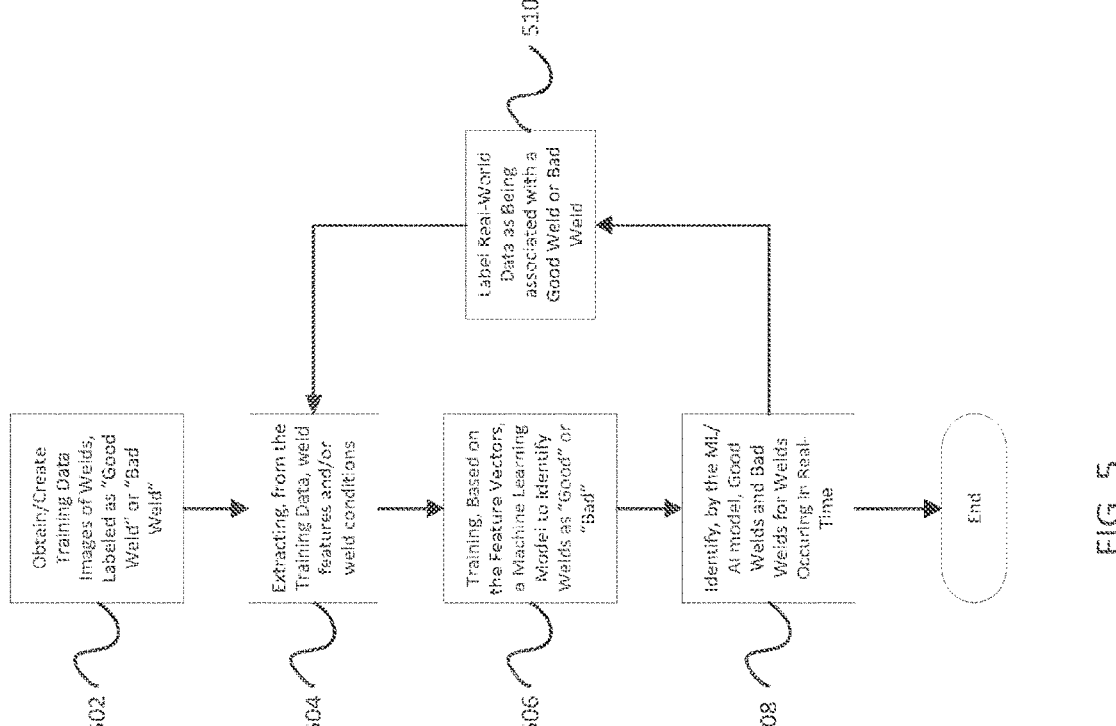

500

502 — Obtain/Create Training Data Images of Welds, Labeled as "Good Weld" or "Bad Weld"

504 — Extracting, from the Training Data, weld features and/or weld conditions

506 — Training, Based on the Feature Vectors, a Machine Learning Model to Identify Welds as "Good" or "Bad"

508 — Identify, by the ML/AI model, Good Welds and Bad Welds for Welds Occurring in Real-Time 510 — Label Real-World Data as Being associated with a Good Weld or Bad Weld End

FIG. 5

WELD QUALITY INSPECTION SYSTEM

CROSS-REFERENCE TO RELATED APPLICATIONS

This U.S. National Stage Patent Application claims the benefit of PCT International Patent Application Serial No. PCT/US2022/014691 filed Feb. 1, 2022 entitled "WELD QUALITY INSPECTION SYSTEM" which claims the benefit of and priority to U.S. Provisional Patent Application Ser. No. 63/144,719, filed Feb. 2, 2021, titled "Weld Quality Inspection System," the entire disclosures of which are hereby incorporated by reference.

FIELD OF THE INVENTION

The present disclosure relates to welding. More particularly, the present disclosure relates to a system for measuring a quality of a weld in real-time.

BACKGROUND

Arc welding is a common process for joining metals by using electricity to create an arc in a gap between an electrode of a welder and at least one metal work piece which heats the metal work pieces and a filler of the electrode enough to cause metals from the work pieces and the filler to melt and fuse together upon cooling.

Weld quality is becoming increasingly important for providing reliable welded joints on resulting products, especially in manufacturing applications. Various systems are known for evaluating weld quality, however they all carry certain disadvantages. There remains a need for improvements to such systems for evaluating weld quality.

SUMMARY

According to an aspect of the disclosure, a weld quality inspection system is provided for indicating a quality of a weld during a welding process on at least one work piece. The system includes an infrared camera configured to provide visual data of a weld pool during creation of the weld, the visual data comprising at least one of an image or video of the weld pool. The system also includes a microphone configured to provide audio data during creation of the weld, the audio data including at least sounds produced by an arc during the welding process. The system also includes at least one operational technology (OT) data source configured to provide OT data related to at least one of a programmable logic controller of a welder, a line robot or a manufacturing execution system. The system also includes a processor configured to receive the visual data, the sound data and the OT data. The processor includes a trained machine learning model configured to determine whether at least one bad weld condition associated with the weld is met based on the visual data, the sound data and the OT data, and to produce an output in response to a detection of the at least one bad weld condition.

According to another aspect of the disclosure, a method is provided for indicating a quality of a weld during a welding process on at least one work piece. The method includes providing an infrared camera providing visual data of a weld pool during creation of the weld, the visual data comprising at least an image or video indicating a temperature of the weld pool. The method also includes providing a microphone providing audio data during creation of the weld, the audio data including at least sounds produced by an arc during the welding process. The method also includes providing at least one operational technology (OT) data source providing OT data related to at least one of a programmable logic controller of a welder, a line robot or a manufacturing execution system. The method also includes receiving, with a processor, the visual data, the sound data, and the OT data, and determining, with a trained machine learning model of the processor, whether at least one bad weld condition associated with the weld is met based on the visual data, the sound data, and the OT data. The method also includes producing an output with the processor in response to a detection of the at least one bad weld condition being met.

Accordingly, the visual data, audio data and OT data together are processed by the processor to identify bad weld conditions, and to produce associated outputs which may be processed to modify the welding process in order to prevent subsequent bad welds. This allows the system to be capable of self-learning and performing real-time weld quality evaluations.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5 is a flow diagram illustrating a possible training process for the AI/ML models included herein.

DESCRIPTION OF THE ENABLING EMBODIMENT

Figure 1:
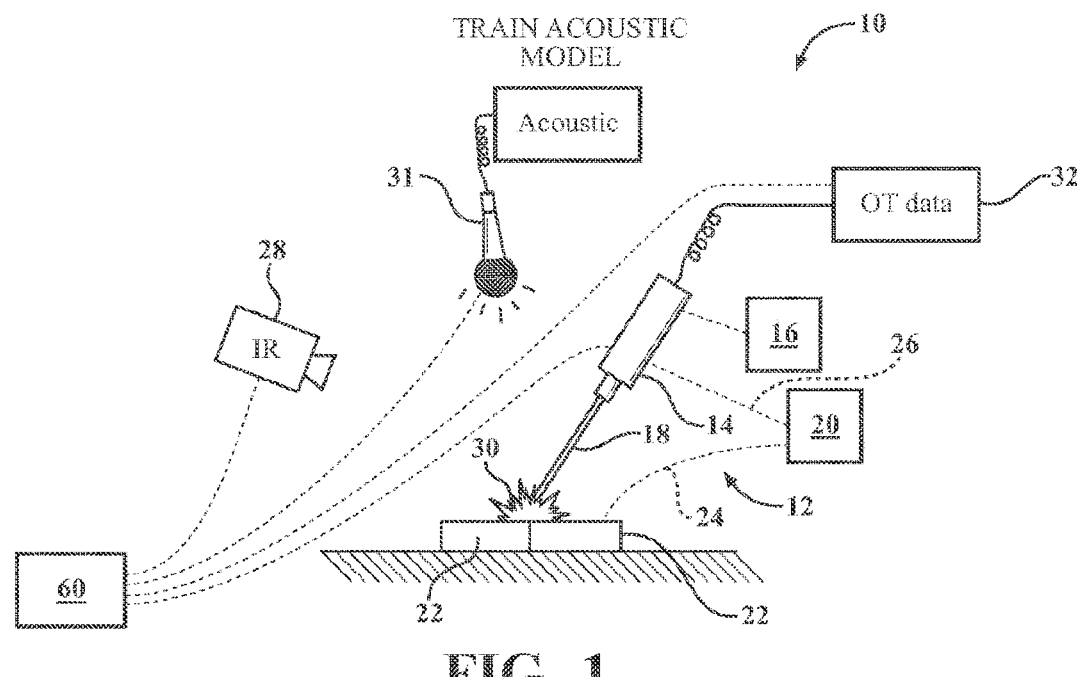
FIG. 1 is a front schematic view of an example embodiment of a weld quality inspection system.
Figure 1A:
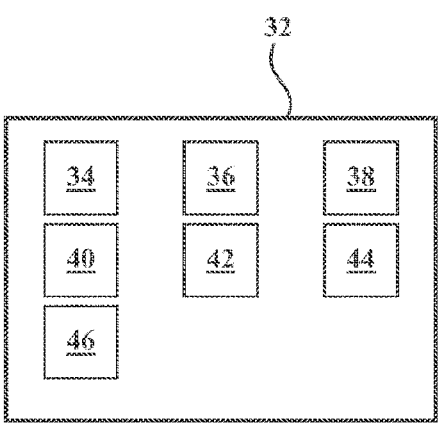
FIG. 1A is a schematic view of various operational technology data sources that may be used in association with the weld quality inspection system.

Embodiments of the present disclosure are described herein. It is to be understood, however, that the disclosed embodiments are merely examples, and other embodiments may take various and alternative forms. The figures are not necessarily to scale; some features could be exaggerated or minimized to show details of particular components. Therefore, specific structural and functional details disclosed herein are not to be interpreted as limiting but merely as a representative basis for teaching one skilled in the art to variously employ the embodiments. As those of ordinary skill in the art will understand, various features illustrated and described with reference to any one of the figures may be combined with features illustrated in one or more other figures to generate embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to the Figures, wherein like numerals indicate corresponding parts throughout the several views, a weld quality inspection system 10 associated with a welding assembly 12 is provided.

The welding assembly 12 of the example embodiment is an arc welding assembly, however, the teachings of the subject disclosure may be applied to other types of welding assemblies. The welding assembly 12 includes an electrode 18 for creating a weld between two work pieces 22 to connect the work pieces 22. The electrode 18 may be consumable or non-consumable and may include a filler material. A power source 20 is electrically connected to the electrode 18 and at least one work piece 22 of the pair of the work pieces 22 being welded for causing a current/arc to be conducted in a gap between the electrode 18 and work piece 22 when the electrode 18 is held in close proximity to the work piece 22 in order to melt the metals of the work pieces 22 and filler/electrode 18 to create the weld upon cooling. More particularly, a work cable 24 extends from the power source 20 to at least one of the work pieces 22, and an electrode cable 26 extends between the power source 20 and the electrode 18 to provide the current to create the arc. The electrode 18 is connected to an electrode holder 14 for being held and moved by a user or a robot 16 (schematically shown, discussed in further detail below). In the event that a robot 16 is employed to provide movement of the electrode 12, the electrode holder 14 maybe be integrated into the robot 16.

The robot 16 is configured to control movement of the electrode holder 14 and electrode 18. It should be appreciated that various types of robots 16, e.g., robotic arms, may be employed for providing automatic or manually controlled movements of the electrode holder 14.

Figure 3:
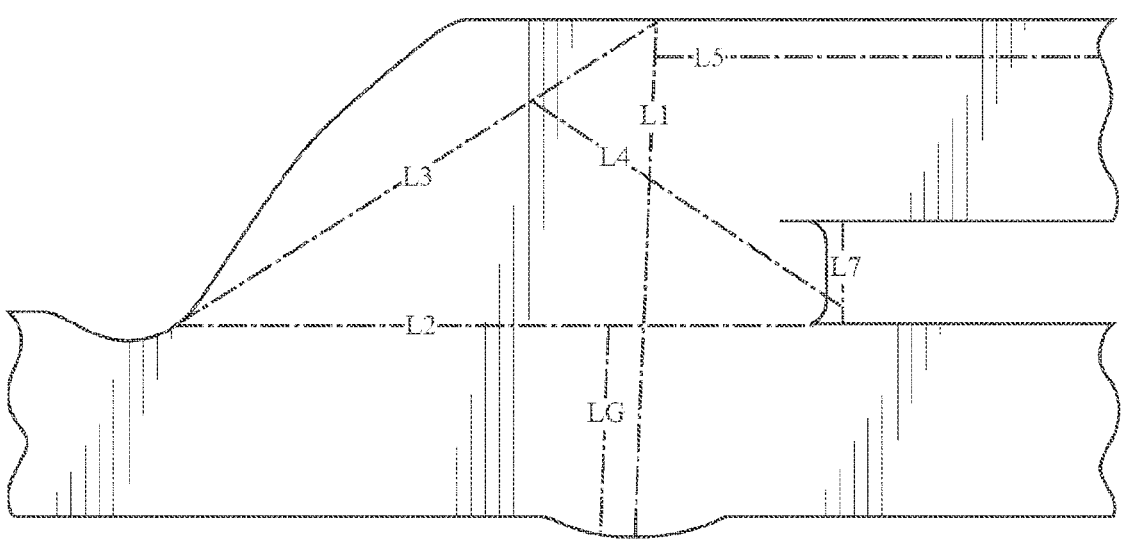
FIG. 3 is a front view of example visual data of a weld obtained from a thermal camera.

The inspection system 10 includes an infrared camera 28 for both visualizing (via image and/or video) and/or measuring a temperature of a weld pool 30 on the work piece 22 during welding (e.g., as shown in FIG. 3). The infrared camera 28 may be configured to detect both a temperature distribution across the weld pool and absolute values of temperatures at specific points of the weld pool. As discussed in further detail below, the thermal image of the weld pool can indicate certain weld quality attributes. For example, thermal image and temperature readings can provide insight into a condition of a gap between work pieces 22 being welded. Initial studies show that with a width change in the gap, temperature varies due to additional modes of thermal disputation. The thermal image also provides approximate estimate calculations and insight into a weld throat, leg and penetration.

The inspection system 10 also includes a microphone 31 configured to detect sound associated with the weld arc and to provide corresponding audio data. As will be discussed in further detail below, the sound of the arc can indicate certain weld quality attributes, especially in combination with data from other sensors, including the infrared camera 28.

The inspection system 10 further includes one or more operational technology (OT) data sources 32 (schematically shown). Generally the OT data sources 32 provide instant feedback on various operational aspects of the welding operation in the form of OT data. The OT data sources 32 may include sensors/other devices for providing OT data including, but not limited to, voltage data 34 at the electrode 18, current data 36 at the electrode 18, resistance data 38 at the electrode 18, robot movement data 40, welder movement data 42 (e.g., three-dimensional coordinates and directions), various other electrode data 44 and wire feed speed data 46.

Figure 4:
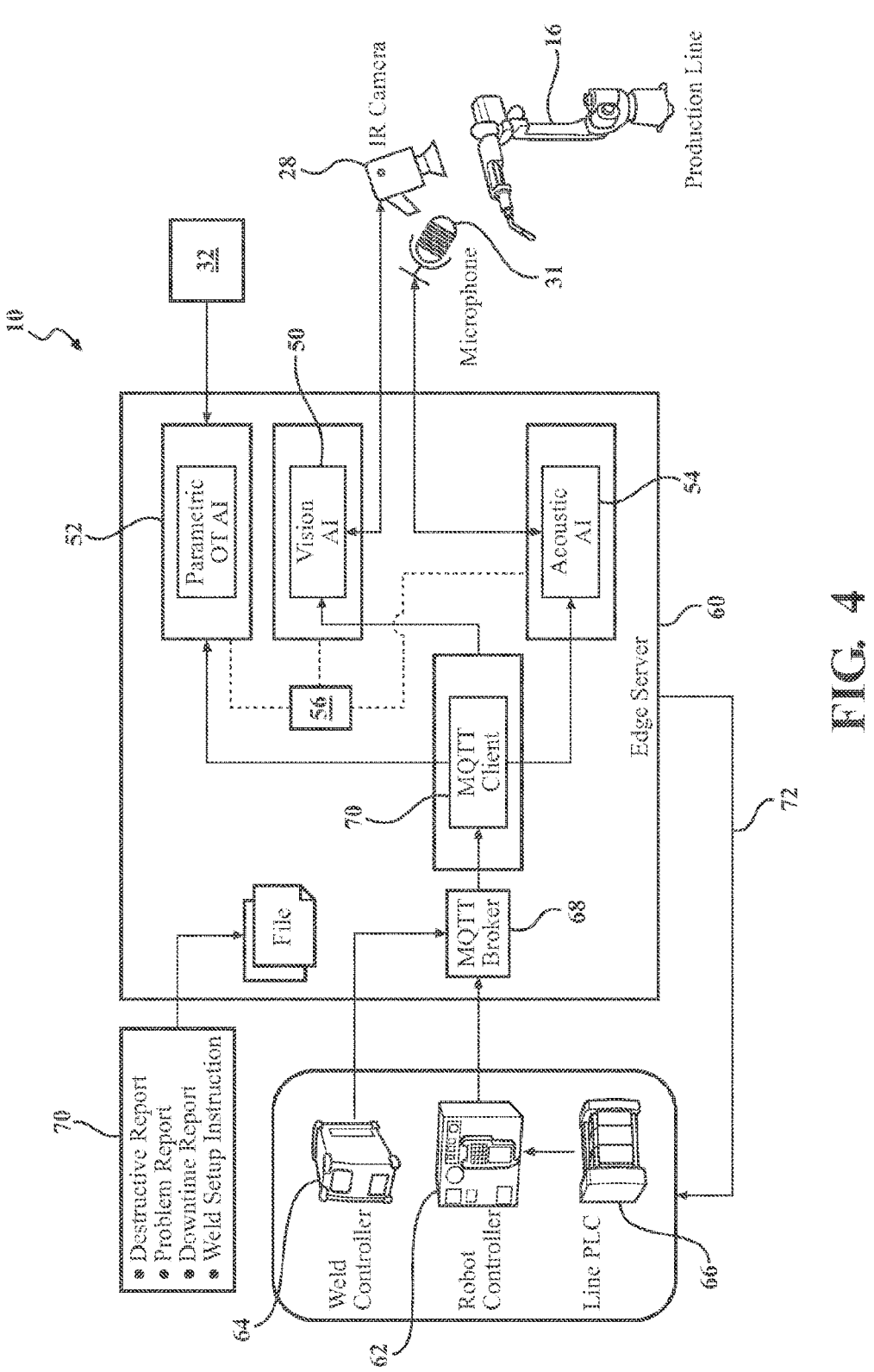
FIG. 4 is a schematic view illustrating operation of the weld quality inspection system.

As illustrated in FIG. 4, the OT data may be extracted from a welder programmable logic control (PLC) 64 associated with the welder, a robot PLC 62 associated with one or more robots 16 and a line PLC 66 associated with a manufacturing execution system (MES) and other equipment used in making the final component.

The inspection system 10 further includes a main controller/processor 60 that is electrically connected to at least the robot 16 via the robot PLC 62, the infrared camera 28, the microphone 31, the weld PLC 64, the OT data sources 32 and the line PLC 66. The controller 60 may be connected to any other electronic device of the subject system and may be configured to control the various devices in different ways. According to the example embodiment, the controller 60 is an edge server, however, other types of controllers may be employed without departing from the scope of the subject disclosure. The controller 60 may be configured to control movement of the robot 16/electrode 18. The controller 60 may also be configured to maintain a welding schedule and an electrode tip replacement schedule. Furthermore, the controller 60 may be configured to report operational data to operators, e.g., via an electronic display or speakers. It should be appreciated that the various PLCs discussed herein may be integrated into/part of the main controller 60, or can be configured as standalone devices that are electrically connected to the main controller 60.

Figure 2:
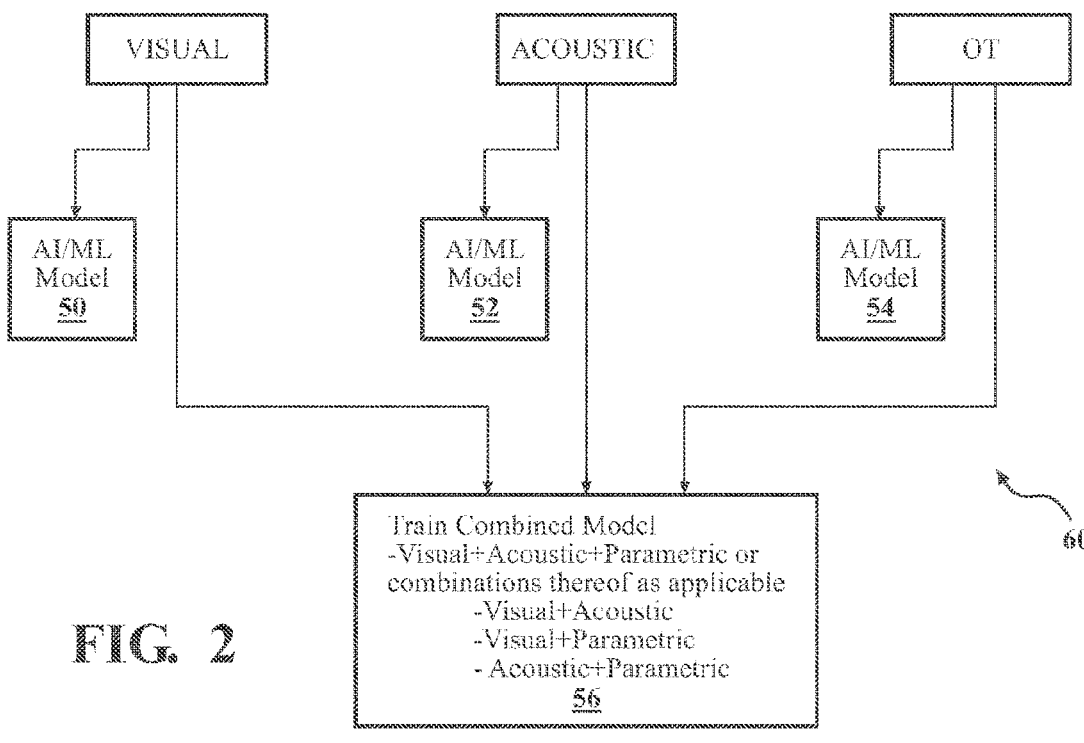
FIG. 2 is a flow diagram of modules that may be used to control the weld quality inspection system.

With reference to FIG. 2, the controller 60 is also configured to pull data from the infrared camera 28, microphone 31 and the OT data sensors 32, and to develop an artificial intelligence/machine learning (AI/ML) algorithm to identify weld quality concerns/conditions in real-time in order to allow a user or robot 16 to correct the weld prior to the occurrence of a bad weld. More particularly, as best shown in FIG. 2, the controller 60 has a visual AI/ML module 50 associated with the infrared camera 28, an acoustic AI/ML module 52 associated with the microphone 31 and an OT data AI/ML module 54 associated with the OT data sensors 32. Each of the respective visual, acoustic and OT data AI/ML modules 50, 52, 54 may be configured to individually detect issues (bad weld conditions) associated with the weld during welding that may lead to bad welds. As used herein, the term "bad weld" may include, but is not limited to, burn through, gaps, incorrect location, cold weld and ropiness. The inspection system 10 also includes a combine AI/ML model 56 that is configured to detect bad welds via a combination of the visual, acoustic and OT data AI/ML models 50, 52, 54.

The controller 60 is configured to employ the combine module 56 to determine failure modes that lead to bad welds in real-time, and thus predict the bad weld and provide feedback to the welder or robot 16 to correct course and prevent the making of a bad weld in real-time. In other words, the inspection system 10 is configured to combine data from the visual, acoustic and OT data AI/ML modules 50, 52, 54 to bring in three senses (touch, hearing and sight) to develop an AI/ML algorithm to confidently identify quality concerns in real-time. Once the combine module 56 is trained to identify such quality concerns, the controller 60 further trains the combine module 56 to predict the quality concern prior to it happening in order to prevent the occurrence through a real-time feedback loop. The controller 60 may then provide instructions to the robot 15, welder 14 and human, alone or in combination to correct the bad weld condition based on the training of the combine module 56.

FIG. 4 is a flow diagram illustrating operation of components of the subject weld quality inspection system 10. As shown, welding data is provided to the controller 60 by the weld PLC 64 and robot movement data is provided to the edge server 60 by the robot PLC 62. Furthermore, assembly line data is provided to the robot PLC 66 from the line PLC 66 to dictate movements of the robot 16. The assembly line data is subsequently provided to the controller 60. Data from the weld PLC 64, robot PLC 62 and line PLC 66 is received by a message queuing telemetry transport (MQTT) broker 68 and associated MQTT client 70 for being translated into a readable format. Data from the MQTT client 70 is subsequently transmitted to the visual, acoustic and OT data AI/ML modules 50, 52, 54 and combined in the combine module 56 to develop the AI/ML algorithm to confidently identify quality concerns in real-time. Additionally, various assembly line reports 72 may be gathered such as a destructive report, problem report, downtime report and weld setup instruction reports (e.g., tip replacement info) and provided to the edge server 60 for further indicated bad weld conditions and/or modifications to operation of the welder 12/robot 16 to prevent bad welds. As indicated by feedback loop 72, based on all of this data, real-time feedback is provided from the edge server 60 to the robot, weld and assembly line PLCs 62, 64, 66 to improve the welding process to prevent bad welds. For example, as further detailed below, operation of the welder 12 and/or robot 16 may be varied to prevent bad weld conditions. Additionally, instructions may be provided to a human welder to accomplish the same.

In view of the foregoing the inspection system 10 includes a combination of an infrared camera 28, microphone 31 and OT data sources 32 which together create a smart system that senses, self-learns and performs real time weld quality evaluations and is configured to predict bad welds in time to allow an operator or robot 16 to prevent the bad weld. To this point, the OT sensor sources 32, acoustic data and visual data provide key indicators required to indicate if a weld arc is well-established and stable. This data can also be used to indicate various quality issues including but not limited to burn through, ropiness, undercut, concavity etc. and an estimation of an edge that is being welded (location or the trim edge) and weld gap conditions.

FIG. 5 is a flow diagram 500 illustrating training of components of the subject weld quality inspection system 10. At 502, welding training data is received by system 10 based on which ML/AI model (such as a classification model, a regression model, linear model, decision tree model, heuristic model, and the like) is being trained. For example, the visual AI/ML module 50 receives/requires training data of welds captured by a camera similar to infrared camera 28. Likewise, acoustic AI/ML model 52 receives/requires audio recording test data (similar to data obtained from microphone 31), and OT data AI/ML module 54 receives/requires welding OT test data (similar to data obtained from OT data sensor 32).

The test data is labeled to indicate whether the test data includes a good weld or a bad weld. The test data may also include weld conditions associated with the weld or welds captured in the training data (e.g., conditions when the weld was created). Weld condition data may include the time required to complete the weld, the stability of the weld arc, temperatures associated with the weld, the environment of the weld, etc. The training data may include one or more welds, each weld indicated as a good weld or a bad weld, and optionally, its weld conditions.

At 504, each learning model receives its respective set of training data, system 10 may extract features and weld parameters from the training data. For example, when training the visual AI/ML module 50, the features extracted from the image training data may include the position of the weld in the image, the width of the weld, the visual pattern created by the weld, the temperature of the weld, the weld gap, etc. System 10 may also extract weld conditions associated with the extracted feature. System 10 generates feature vectors based on the features extracted from the test data and their weld conditions. At 506, each ML/AI model is trained, with its respective feature vectors. At 508, the system receives real-time data from a source (e.g., infrared camera 28, microphone 31, and OT data sensor 32) and determines if the data indicates or predicts a bad weld or a good weld. At 510 the data collected during use may be used to create additional training data that may be used to further train each respective AI/ML model as described above. Though not directly discussed one of ordinary skill in the art would understand how the training of combined model 56 would be trained and operated using data combined from all three sources based on the above description of training the individual AI/ML models.

In some embodiments, the systems and methods may be configured to further include training the AI/ML models with structured data training sets. Each ML/AI model requires its own set of training data. The training data may be created by human review and labeling of the data, pretrained AI/ML models or any other appropriate methodology may also be utilized.

In some embodiments, the systems and methods may be configured to utilize real-time data fields from the system for the creation of training data. For example, an apparatus envisioned for use with the described systems and methods will record inputs from the input devices (e.g., infrared camera 28, microphone 31, and OT data sensor 32) to create unstructured, unlabeled training data. Then through human review, or any other suitable methodology, label and structure the data for use as training datasets. Training datasets may also be created by the systems and methods described herein after the ML/AL models have been trained.

In some embodiments, the systems and methods described herein may be configured to utilize a line-side server positioned at the manufacturing location. The line-side server has stored therein the AI/ML models as well as their training datasets. The systems and methods described herein may further include display devices communicatively coupled to the line server in order to display notifications to end-users. For example, notifications generated by the system may include indications that a weld in progress is a bad weld based on a determination made by an AI/ML model. Further, the systems and methods described herein may indicate a need for an end-user to correct an issue related to a bad weld.

In some embodiments, the systems and methods described herein may include avenues for determining why a bad weld was created. The systems and methods described herein may monitor received OT, audio and/or visual data related to the bad welds in order to discern patterns. The systems and methods described herein may further include human inspection of the environment related to the bad weld. Information from the OT data as well as the human inspection related to the bad weld being stored. The review of the data related to the bad weld being done by a human, an AI/ML model, or any other suitable method.

In some embodiments, the systems and methods described herein may use binary classification for AI/ML models used to determine if a weld is a good weld or a bad weld. Further, the system may include multiclassification AI/ML models for debugging purposes. The determinations created by the AI/ML models include confidence scores. The systems and methods described herein include thresholds to compare against the confidence scores of the AI/ML model determinations. Further, each OT data (and/or audio/visual data) metric available to the system may include thresholds to determine what is ordinary and what is not. Thresholds breached during a bad weld indicating that the metric related to the breached threshold contributed to the bad weld. The systems and methods described herein utilize root cause analysis to determine which data metrics related to a bad weld indicate a root cause.

In some embodiments, the systems and methods described herein may include alterations of the welding procedure based on the detection of a root cause. When a bad weld or a series of bad welds is detected and a pattern emerges regarding the conditions associated with the bad weld, the system and methods described herein may suggest an alteration to the welding process based on the conditions associated with the bad weld. For example, where a weld procedure includes a variance for the temperature of the weld but bad welds occur when the weld temperature occurs at the lowermost temperature of the variance, the AI/ML model would indicate that the lowermost temperature of the variance must be increased. The conditions associated with the weld condition may include OT data as well as data obtained from the infrared camera 28, microphone 31, or based on observations made by a human operator.

In some embodiments the apparatus for indicating a quality of a weld during a welding process on at least one workpiece 22, comprises an infrared camera 28 configured to provide visual data of a weld pool during the creation of the weld, the visual data comprising at least an image or video of the weld pool, a microphone 31 configured to provide audio data during creation of the weld, the audio data including at least sounds produced by an arc during the welding process; at least one operational technology (OT) data source 32 configured to provide OT data related to at least one of a programmable logic controller of a welder, a line robot or a manufacturing execution system; a processor receives the visual data, the sound data, and the OT data, a trained machine learning model, executed by the processor, determine the conditions associated with the weld based on the visual data, the sound data and the OT data and further determine whether at least one bad weld condition is met; and provide feedback in response to a detection of at least one bad weld condition being met.

In some embodiments, the apparatus is further configured to: determine by the trained machine learning model, based on the visual data, the sound data and the OT data, the weld arc stability, wherein weld arc stability is used by the machine learning model to determine the quality of the weld related to at least one bad weld condition selected from the group consisting of: burn through rate of weld, ropiness of weld, concavity of weld, and weld gap conditions.

In some embodiments, the apparatus is further configured to: further train the trained machine learning model based on the visual data, the sound data, and the OT data associated with the detection of at least one bad weld condition.

In some embodiments, the apparatus is further configured to: maintain a welding schedule and an electrode tip replacement schedule associated with at least one welding device.

In some embodiments, the apparatus is further configured to: generate a report, wherein the report is selected from the group consisting of a destructive report, a problem report, a downtime report, and a weld setup instruction report.

In some embodiments, the apparatus is further configured to: send to an edge server the report, and display the report to the user on a display device.

In some embodiments, the apparatus is further configured to: receive from the infrared camera estimate calculations into a weld throat, a weld leg, and a weld penetration.

In some embodiments, the apparatus is configured to: include root cause analysis of the OT data related to a bad weld in order to determine a possible cause for the bad weld.

In some embodiments the apparatus for indicating a quality of a weld during a welding process on at least one workpiece 22, comprises an infrared camera 28 configured to provide visual data of a weld pool during the creation of the weld, the visual data comprising at least an image or video and temperature of the weld pool, a microphone 31 configured to provide audio data during creation of the weld, the audio data including at least sounds produced by an arc during the welding process; at least one operational technology (OT) data source 32 configured to provide OT data related to at least one of a programmable logic controller of a welder, a line robot or a manufacturing execution system; a processor receives the visual data, the sound data, and the OT data, a trained machine learning model, executed by the processor, determine the conditions associated with the weld based on the visual data, the sound data and the OT data and further determine whether at least one bad weld condition is met; and provide feedback in response to a detection of at least one bad weld condition being met.

In some embodiments, the apparatus is further configured to include root cause analysis of at least the OT data related to the at least one bad weld condition in order to determine if there is a pattern related to the OT data related to the at least one bad weld condition.

In some embodiments, the apparatus is further configured to: include in the root cause analysis data obtained associated with the at least one bad weld condition based on a human inspection of the bad weld.

In some embodiments, the apparatus is further configured to include in the root cause analysis, acceptable variances related to the OT data where OT data outside of the acceptable variances during a bad weld indicates a cause of the bad weld and wherein the training data is used to further train the AI/ML models for the subsequent determinations of bad weld conditions.

In some embodiments, the apparatus is further configured to generate an instance of training data based on the visual data, the sound data and the OT data received during a weld, where the instance of training data is labeled based on the determination of the weld being one of a bad weld or a good weld, and wherein the training data is used to further train the AI/ML models for the subsequent determinations of bad weld conditions.

In some embodiments, the apparatus is further configured to store data received from the infrared camera as positional data having a temperature component and a time component related to the weld for determining whether the at least one bad weld condition exists.

In some embodiments, the apparatus is further configured to where at least one bad weld condition associated with the weld determined trained machine learning model includes at least one of the burn through rate of the weld, ropiness of the weld, concavity of the weld, and weld gap conditions.

In some embodiments, the apparatus is further configured to receive from the infrared camera estimate calculations into a weld throat, a weld leg, and a weld penetration for determining whether the at least one bad weld condition exists.

In some embodiments the method for indicating a quality of a weld during a welding process on at least one workpiece 22, comprises an infrared camera 28 configured to provide visual data of a weld pool during the creation of the weld, the visual data comprising at least an image or video and temperature of the weld pool, a microphone 31 configured to provide audio data during creation of the weld, the audio data including at least sounds produced by an arc during the welding process; at least one operational technology (OT) data source 32 configured to provide OT data related to at least one of a programmable logic controller of a welder, a line robot or a manufacturing execution system; a processor receives the visual data, the sound data, and the OT data, a trained machine learning model, executed by the processor, determine the conditions associated with the weld based on the visual data, the sound data and the OT data and further determine whether at least one bad weld condition is met; and provide feedback in response to a detection of at least one bad weld condition being met.

In some embodiments, the method is further configured to conduct a root cause analysis of at least the OT data related to the at least one bad weld condition in order to determine if there is a pattern related to the OT data related to the at least one bad weld condition.

In some embodiments, the method is further configured to include in the root cause analysis data obtained associated with the at least one bad weld condition based on a human inspection of the bad weld.

In some embodiments, the method is further configured to include in the root cause analysis, acceptable variances related to the OT data where OT data outside of the acceptable variances during a bad weld indicates a cause of the bad weld, and wherein the training data is used to further train the AI/ML models for the subsequent determinations of bad weld conditions.

In some embodiments, the method is further configured to generate an instance of training data based on the visual data, the sound data and the OT data received during a weld, where the instance of training data is labeled based on the determination of the weld being one of a bad weld or a good weld, and wherein the training data is used to further train the AI/ML models for the subsequent determinations of bad weld conditions.

In some embodiments, the method is further configured to store data received from the infrared camera as positional data having a temperature component and a time component related to the weld for determining whether a bad weld condition exists.

In some embodiments, the method is further configured to wherein the at least one bad weld condition associated with the weld determined trained machine learning model includes at least one of the burn through rate of the weld, ropiness of the weld, concavity of the weld, and weld gap conditions.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. It should be appreciated that various embodiments discussed herein may be combined with one another in various ways.

What is claimed is:

1. A weld quality inspection system for indicating a quality of a weld during a welding process on at least one work piece, comprising:

at least one infrared camera configured to provide visual data of a weld pool during creation of the weld, the visual data comprising at least an image or video of the weld pool;

at least one microphone configured to provide audio data during creation of the weld, the audio data including at least sounds produced by an arc during the welding process;

at least one operational technology (OT) data source configured to provide process parameter data related to the creation of the weld;

a processor configured to receive the visual data, the sound data and the OT data, the processor including a trained artificial intelligence/machine learning (AI/ML) model configured to analyze, as input, a combination of the visual data, audio data, OT data, and human inspection data arising from a human inspection of the weld;

wherein the AI/ML model is configured to perform root cause analysis by correlating bad weld conditions from the collected integrated visual, audio, OT data, and human inspection data;

wherein the processor outputs, during ongoing weld creation, a weld quality indication specifying at least one of burn-through, ropiness, or weld gap condition, and a root cause analysis based on patterns detected in the integrated visual, audio, OT data, and human inspection data; and wherein the processor provides real time feedback to an operator or robot for corrective action based on the determined weld quality identification and the root cause.

2. The weld inspection system of claim 1, wherein the processor is further configured to include in the root cause analysis, acceptable variances related to the OT data where OT data outside of the acceptable variances during a bad weld indicates a cause of the bad weld and wherein the training data is used to further train the AI/ML model for the subsequent determinations of bad weld conditions.

3. The weld inspection system of claim 1, wherein the processor is further configured to generate an instance of training data based on the visual data, the sound data, and the OT data received during a weld, where the instance of training data is labeled based on the determination of the weld being one of a bad weld or a good weld, and wherein the training data is used to further train the AI/ML model for the subsequent determinations of bad weld conditions.

4. The weld inspection system of claim 1, wherein the processor is further configured to store data received from the infrared camera as positional data having a temperature component and a time component related to the weld for determining the weld quality indication.

5. The weld inspection system of claim 1, wherein the processor is further configured to estimate calculations into a weld throat, a weld leg, and a weld penetration based on readings from the infrared camera for determining the weld quality indication.

6. A method for indicating a quality of a weld during a welding process on at least one work piece, comprising:

providing an infrared camera providing visual data of a weld pool during creation of the weld, the visual data comprising at least an image or video of the weld pool;

providing a microphone providing audio data during creation of the weld, the audio data including at least sounds produced by an arc during the welding process;

providing at least one operational technology (OT) data source providing OT data related to at least one of a programmable logic controller of a welder, a line robot or a manufacturing execution system;

receiving, with a processor, the visual data, the sound data, the OT data, and human inspection data, and with the processor, inputting the visual data, the sound data, the OT data, and human inspection data together into a trained artificial intelligence/machine learning (AI/ML) model configured to fuse the visual data, the sound data, the OT data, and human inspection data, such that the determination of a bad weld condition is based on the fused analysis of the visual data, the sound data, the OT data, and human inspection data;

performing a root cause analysis with the AI/ML model by correlating bad weld conditions from the fused integrated visual, audio, OT data and human inspection data;

wherein the trained machine learning model is configured to identify one or more bad weld conditions selected from the group consisting of burn through rate of the weld, ropiness of the weld, concavity of the weld, and weld gap conditions, and to provide in real time a feedback output to an operator or robot a corrective action based on the determined weld quality identification and the root cause analysis.

7. The weld inspection method of claim 6, wherein the processor is further configured to include in the root cause analysis, acceptable variances related to the OT data where OT data outside of the acceptable variances during a bad weld indicates a cause of the bad weld, and wherein the training data is used to further train the AI/ML model for the subsequent determinations of bad weld conditions.

8. The weld inspection method of claim 6, wherein the processor is further configured to generate an instance of training data based on the visual data, the sound data, and the OT data received during a weld, where the instance of training data is labeled based on the determination of the weld being one of a bad weld or a good weld, and wherein the training data is used to further train the AI/ML model for the subsequent determinations of bad weld conditions.

9. The weld inspection method of claim 6, wherein the processor is further configured to store data received from the infrared camera as positional data having a temperature component and a time component related to the weld for determining whether a bad weld condition exists.

* * * * *